United States Patent
Shibata et al.

(10) Patent No.: US 11,429,985 B2
(45) Date of Patent: Aug. 30, 2022

(54) INFORMATION PROCESSING DEVICE CALCULATING STATISTICAL INFORMATION

(71) Applicant: KABUSHIKI KAISHA TOSHIBA, Minato-ku (JP)

(72) Inventors: Tomoyuki Shibata, Kawasaki (JP); Yuto Yamaji, Kawasaki (JP); Hideo Umeki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 649 days.

(21) Appl. No.: 15/695,641

(22) Filed: Sep. 5, 2017

(65) Prior Publication Data

US 2018/0276471 A1  Sep. 27, 2018

(30) Foreign Application Priority Data

Mar. 21, 2017  (JP) .............................. JP2017-054986

(51) Int. Cl.
  *G06Q 30/02* (2012.01)
  *G06Q 10/06* (2012.01)
  *G06V 20/80* (2022.01)

(52) U.S. Cl.
  CPC ....... *G06Q 30/02* (2013.01); *G06Q 10/06393* (2013.01); *G06V 20/80* (2022.01)

(58) Field of Classification Search
  CPC ......... G06K 9/00577; G06Q 10/06393; G06Q 30/02; G06V 20/80

(Continued)

(56) References Cited

U.S. PATENT DOCUMENTS 10,147,210 B1 * 12/2018 Desai ................. G06K 9/00228
2009/0052739 A1   2/2009 Takahashi et al.
(Continued)

FOREIGN PATENT DOCUMENTS

EP    2 808 838 A1   12/2014
JP    2008-35301 A    2/2008
(Continued)

OTHER PUBLICATIONS

Popa, et al., Semantic Assessment of Shopping Behavior Using Trajectories, Shopping Related Actions, and Context information, 34 Pattern Recognition Letters 7 at pp. 809-819 (2013) (Year: 2013).*

(Continued)

*Primary Examiner* — Charles Guiliano
(74) *Attorney, Agent, or Firm* — Oblon, McClelland, Maier & Neustadt, L.L.P.

(57) ABSTRACT

According to one embodiment, an information processing device includes a processor and a memory. The processor determines whether an object included in an image belongs to a first group or not. The processor calculates at least one of first statistical information of an object determined to belong to the first group or second statistical information of an object determined not to belong to the first group. The processor stores at least one of the first statistical or the second statistical information in the memory. The processor executes display processing for at least one of the first statistical information or the second statistical information stored in the memory.

10 Claims, 9 Drawing Sheets

(58) Field of Classification Search
USPC ............................. 705/7.12, 7.29, 7.39
See application file for complete search history.

(56) References Cited

U.S. PATENT DOCUMENTS

| | | | |
|---|---|---|---|
| 2010/0014721 A1* | 1/2010 | Steinberg | G06K 9/00288 |
| | | | 382/118 |
| 2010/0114802 A1 | 5/2010 | Bobbitt et al. | |
| 2011/0058028 A1 | 3/2011 | Sakai | |
| 2011/0267529 A1 | 11/2011 | Tabata | |
| 2013/0050522 A1 | 2/2013 | Mineshita | |
| 2014/0278742 A1* | 9/2014 | MacMillan | G06Q 30/0201 |
| | | | 705/7.29 |
| 2015/0146921 A1 | 5/2015 | Ono et al. | |
| 2015/0199698 A1 | 7/2015 | Yoshitake et al. | |
| 2015/0381947 A1* | 12/2015 | Renkis | G08B 13/196 |
| | | | 348/159 |
| 2016/0307215 A1* | 10/2016 | Kogoshi | G06Q 30/0201 |
| 2017/0193309 A1* | 7/2017 | Kanda | G06T 7/20 |
| 2018/0039860 A1 | 2/2018 | Nakasu et al. | |
| 2018/0197018 A1 | 7/2018 | Nakasu et al. | |

FOREIGN PATENT DOCUMENTS

| | | |
|---|---|---|
| JP | 2008-131559 A | 6/2008 |
| JP | 2009-55139 A | 3/2009 |
| JP | 2011-81763 A | 4/2011 |
| JP | 2011-160413 A | 8/2011 |
| JP | 2012-105358 A | 5/2012 |
| JP | 2012-124658 A | 6/2012 |
| JP | 2013-46135 A | 3/2013 |
| JP | 2013-161269 A | 8/2013 |
| JP | 2013-161394 A | 8/2013 |
| JP | 2015-069580 A | 4/2015 |
| JP | 2015-133093 A | 7/2015 |
| JP | 2016-122300 A | 7/2016 |
| JP | 2016-134144 A | 7/2016 |
| JP | 2018-22343 A | 2/2018 |
| JP | 2018-112880 A | 7/2018 |
| WO | WO 2013/108686 A1 | 7/2013 |

OTHER PUBLICATIONS

Hema Raghavan et al., "Active Learning with Feedback on Both Features and Instances", Journal of Machine Learning Research (vol. 7), XP055551928, Dec. 1, 2006, pp. 1655-1686.
Simone Stumpf et al., "Toward Harnessing User Feedback for Machine Learning", 2007 International Conference on Intelligent User Interfaces (IUI 2007), Jan. 28-31, 2007, pp. 82-91.
Mehryar Mohri, et al., "Foundations of Machine Learning—Chapter 1", MIT Press, XP055417012, May 14, 2014, pp. 1-9.
Teddy Ko, "A Survey on Behavior Analysis in Video Surveillance for Homeland Security Applications", 2008 37th IEEE Applied Imagery Pattern Recognition Workshop (AIPR '08), XP031451798, Oct. 15-17, 2008, pp. 1-8.

* cited by examiner

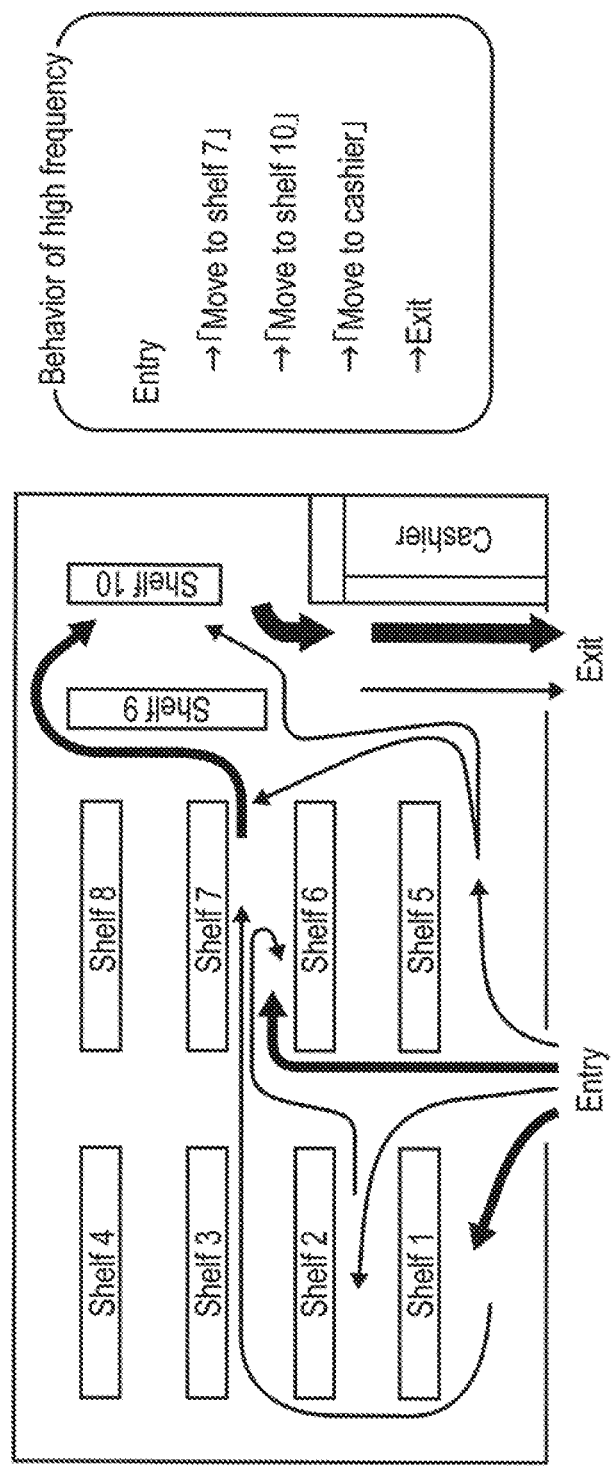
F I G. 4

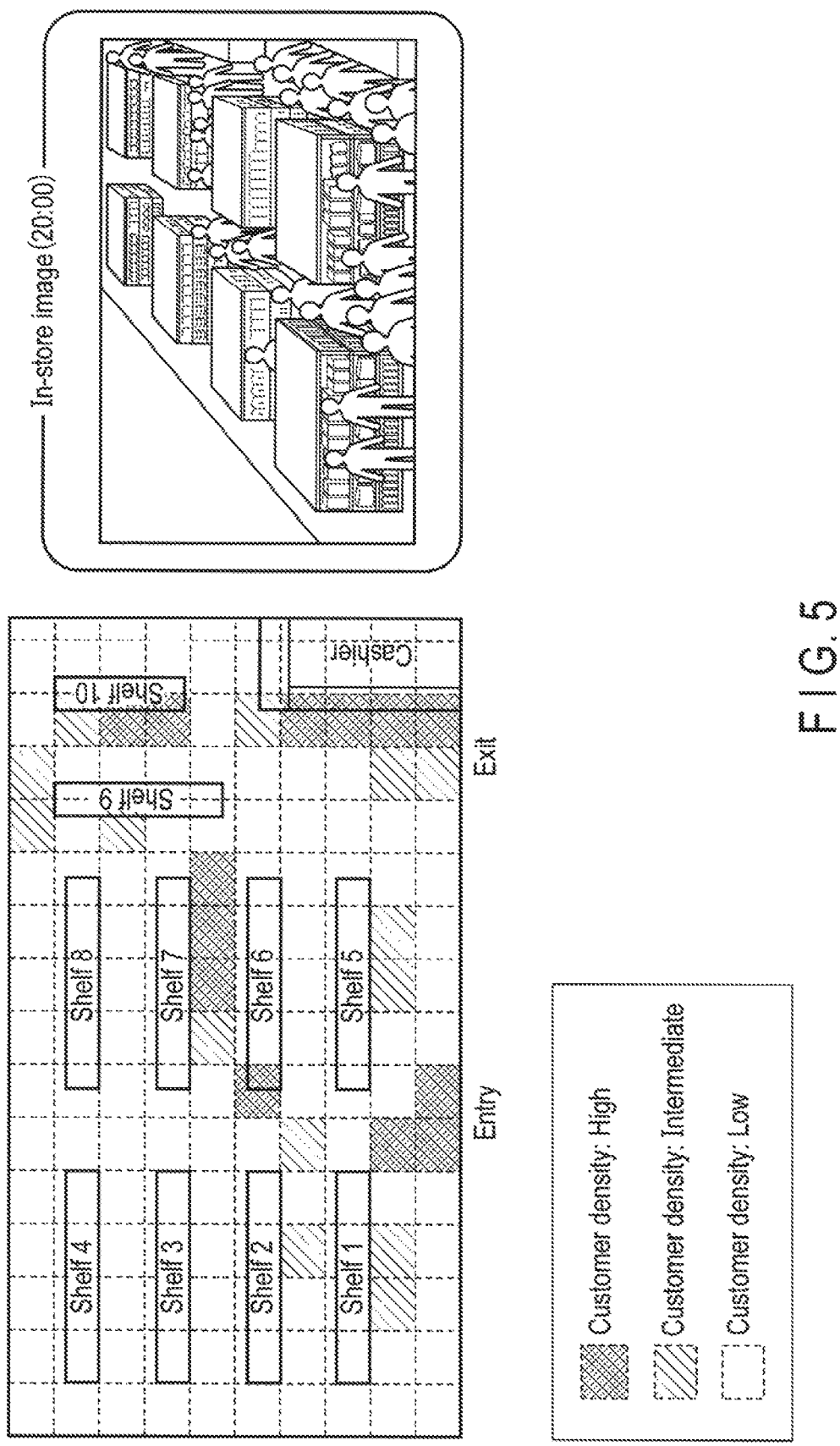
F I G. 5

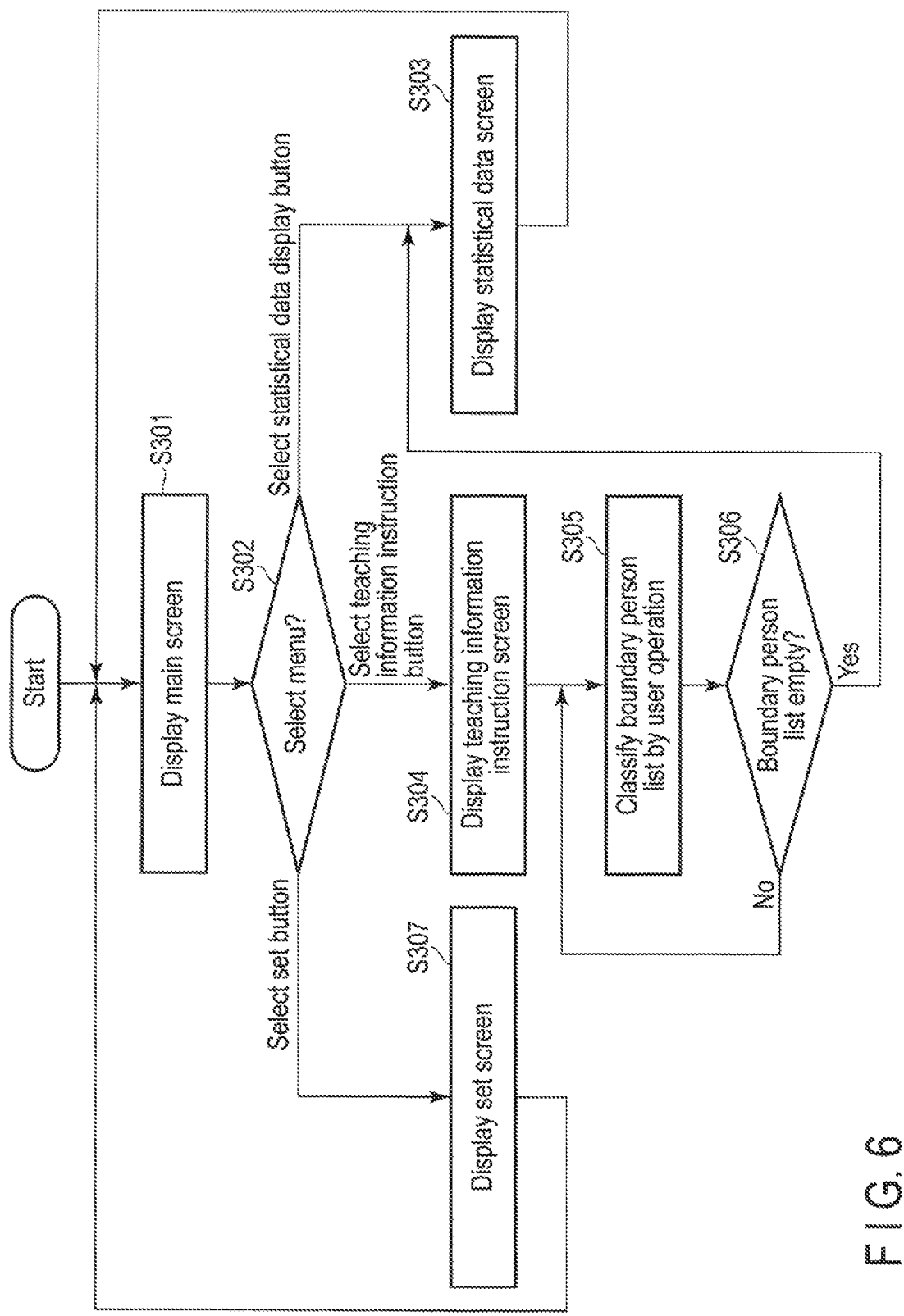
F I G. 6

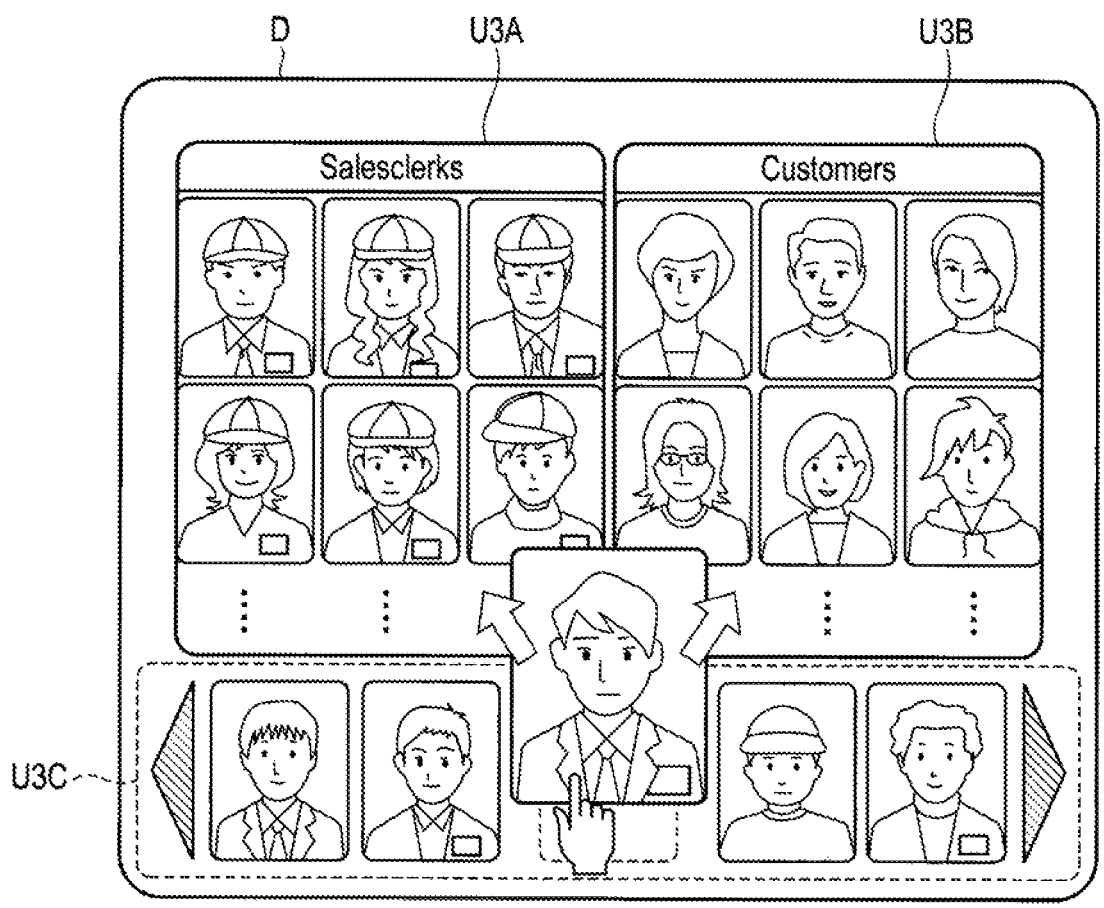
F I G. 8

D

U4A — ● Collection period
☐Month ☐Day ☐Time ~ ☐Month ☐Day ☐Time

U4B — ● Classification
☐ Salesclerks
☑ Customers

U4C — ● Type of statistical data to be displayed
☐ Number
☑ Attribute information
☐ Degree of crowdedness
☐ Serving time
⋮

Return

F I G. 9

Color of clothes T1

| Feature quantity | Explanatory information |
|---|---|
| 0x100 | Red clothes |
| 0x101 | Yellow clothes |
| 0x102 | Green clothes |
| 0x103 | Blue clothes |
| 0x104 | Purple clothes |
| ⋮ | ⋮ |

Type of clothes T2

| Feature quantity | Explanatory information |
|---|---|
| 0x200 | T-shirt |
| 0x201 | Shirt |
| 0x202 | Jacket |
| 0x203 | Jumper |
| 0x204 | Apron |
| ⋮ | ⋮ |

F I G. 10

INFORMATION PROCESSING DEVICE CALCULATING STATISTICAL INFORMATION

CROSS-REFERENCE TO RELATED APPLICATIONS

This application is based upon and claims the benefit of priority from Japanese Patent Application No. 2017-054986, filed Mar. 21, 2017, the entire contents of which are incorporated herein by reference.

FIELD

Embodiments described herein relate generally to an information processing device calculating statistical information.

BACKGROUND

A technology of automatically extracting an object from image data captured with a camera and tracking movement of the extracted object has been developed. The technology of tracking object extracted from the image data has been used to recognize, for example, actions of customers in stores.

BRIEF DESCRIPTION OF THE DRAWINGS

FIG. 4 is an Illustration showing customer flows in a certain time zone according to the present embodiment.

FIG. 5 is an illustration showing a customer's congestion degree in a certain time zone.

FIG. 6 is a flowchart showing state transition of an user interface of the information processing device according to the present embodiment.

FIG. 8 is illustration showing an example of a teaching information instruction screen concerning the classification of salesclerks and customers.

FIG. 9 is an illustration showing an example of a setting screen according to the present embodiment.

FIG. 10 is a table showing an example of a feature explanation table according to the present embodiment.

DETAILED DESCRIPTION

Figure 1:
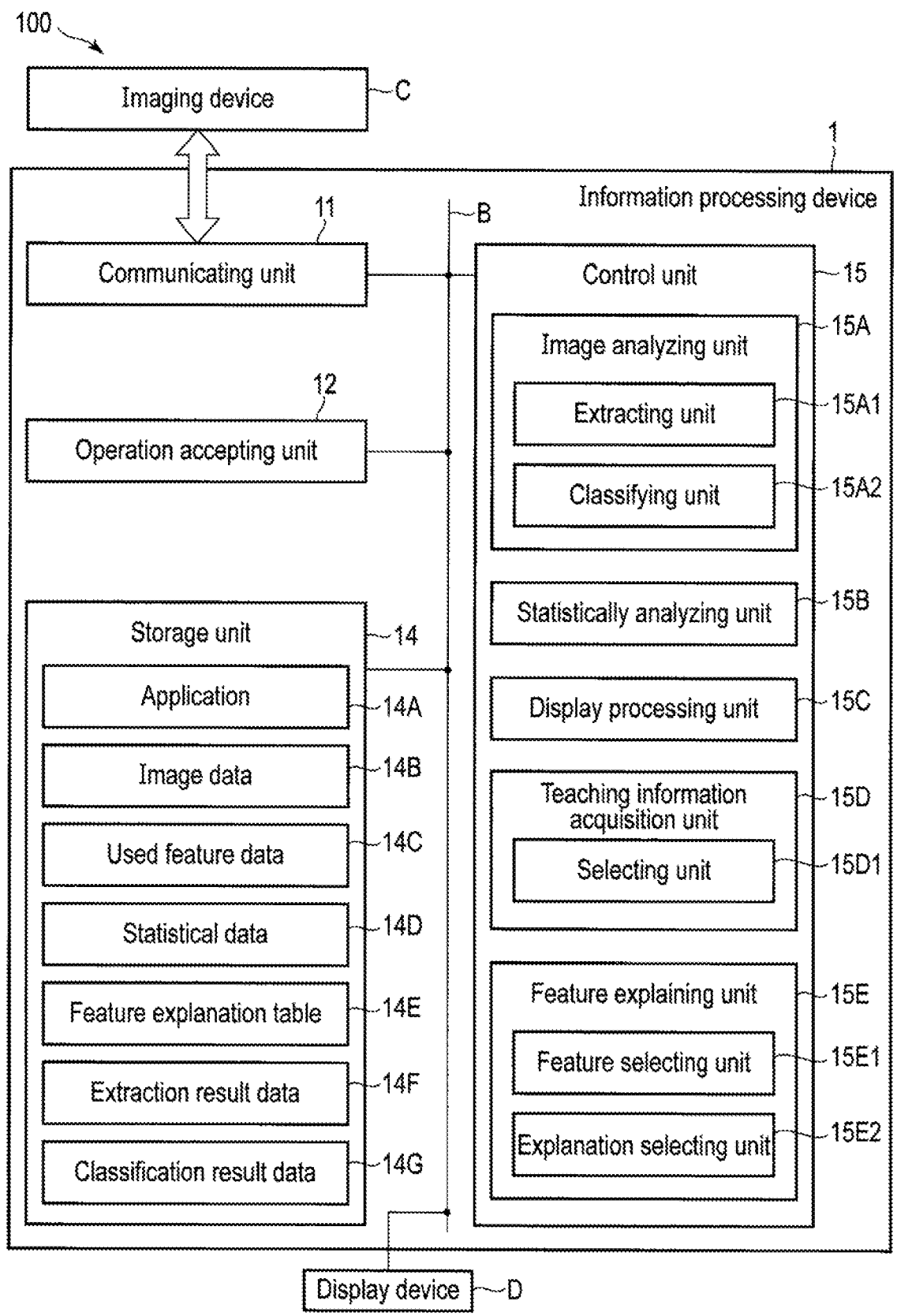
FIG. 1 is a block diagram showing an example of a configuration of an information processing system according to a present embodiment.

Embodiments will be described hereinafter with reference to the accompanying drawings. In the following explanations, approximately or substantially the same constituent elements and functions are denoted by the same reference numerals and are explained as needed.

In general, according to the present embodiment, an information processing device includes a processor and a memory which is connected to the processor. The processor determines whether an object included in an image belongs to a first group or not. The processor calculates at least one of first statistical information of an object determined to belong to the first group or second statistical information of an object determined not to belong to the first group. The processor stores at least one of the first statistical information or the second statistical information in the memory. The processor executes display processing for at least one of the first statistical information or the second statistical information stored in the memory.

The information processing device according to the present embodiment analyzes image data and executes statistical processing of objects reflected in the image data.

In the present embodiment, the object implies a person, a movable object and a stationary object except a person, and the like. The object is assumed to be a target which is recognized based on the image data. In addition, in the present embodiment, selection of the object implies selection of the object displayed on the screen, selection of identification information of the object displayed on the screen, and the like.

The information processing device according to the present embodiment analyzes the image data, classifies the objects reflected in the image data into a first group and a second group, and executes statistical processing of a classification result. More specifically, the information processing device according to the present embodiment generates trace data of the persons reflected in the image data, further executes classification or tagging of the persons, and executes extraction and tracing of a person belonging to a specific category or a person to which a specific tag is applied, and calculation of statistical data on the extracted persons.

The information processing device according to the present embodiment is used for the purpose of, for example, analyzing the customer trend in a certain store. Since salesclerks and customers exist together in a store, the information processing device according to the present embodiment first extracts persons by using the image data in the store captured with the camera, and classifies the extracted persons into a customer group and a salesclerk group. Next, the information processing device according to the present embodiment excludes the persons belonging to the salesclerk group from the persons obtained from the image data and extracts the persons belonging to the customer group, and traces the extracted persons belonging to the customer group. The information processing device according to the present embodiment can thereby recognizing a customer's action and calculate indices such as a degree of crowdedness of the customers in the store. Then, the user can analyze the customer trend in the store based on the statistical data.

If the information used for classification is insufficient in the classification of the persons, an exact classification result cannot necessarily be obtained. In this case, for example, the user can increase the precision of classification and can further increase the reliability of the statistical data calculated with the classification result, by inputting the feature quantity used for the classification or correct data of the classification result to the information processing device according to the present embodiment. A structure of the information processing device according to the present embodiment and a flow of the processing will be described hereinafter in detail.

In the present embodiment, an example of capturing the inside of the store with a camera is explained. However, the information processing device according to the present embodiment can be applied to analysis of actions or movements of objects in various environments, for example, analysis of outdoor events, analysis of pedestrians walking in towns, analysis of actions of living things, and the like.

In the present embodiment, for example, persons such as salesclerks or customers are set as targets of recognition. However, the targets of recognition are not limited to persons but may be, for example, movable objects such as living things other than persons, stationary objects, and the like.

FIG. 1 is a block diagram showing an example of a configuration of an information processing system 100 according to the present embodiment.

The information processing system 100 includes an imaging device C, a display device D, and an information processing device 1. The display device D may be contained in the information processing device 1.

The imaging device C captures image data and transmits the image data to the information processing device 1 by a cable or wireless communications. Transmission of the image data from the imaging device C to the information processing device 1 may be executed in real time. The imaging camera C may be, for example, a camera for monitoring. The imaging device C can sequentially capture, for example, several frames or more (for example, 30 frames/second) of the image data per second. The imaging device C may be contained in the information processing device 1.

The capturing direction, capturing range, and the like of the imaging device C may be changeable under commands received from the information processing device 1.

The display device D is, for example, a display. The user can visually recognize display on the display. More specifically, a liquid crystal display, a plasma display, an organic EL display, a three-dimensional display, and the like can be used as the display device D.

The information processing device 1 may be a stationary computer or a mobile terminal which can be carried by the user. For example, a desktop computer, a tablet computer, a notebook computer, a smartphone, a server device, and the like can be used as the information processing device 1.

The information processing device 1 includes a communicating unit 11, an operation accepting unit 12, a storage unit 14, and a control unit 15.

The communicating unit 11 is a device configured to execute data communications with the imaging device C by a cable or wireless means. The communicating unit 11 transmits a command, an address, data, a signal, and the like to the imaging device C or receives a command, an address, data, a signal, and the like from the imaging device C, via a built-in communication controller. In the present embodiment, for example, Bluetooth, wireless LAN (Local Area Network), and the like can be used as the wireless communications.

The operation accepting unit 12 accepts the user operation executed for the information processing device 1 and sends the operation data to the control unit 15. The operation accepting unit 12 may be, for example, a button, a touch panel provided on the display, a pointing device such as a mouse, or a keyboard. In addition, the operation accepting unit 12 may accept the user operation for the imaging device C. In this case, the operation accepting unit 12 transmits the operation data to the control unit 15. The control unit 15 converts the operation data into a command corresponding to the operation data and transmits the command to the imaging device C via the communicating unit 11.

The storage unit 14 stores various types of data, information, and programs used in the information processing device 1. Although the storage unit 14 contains a nonvolatile memory, the nonvolatile memory may be combined with a volatile memory.

For example, various memories such as Solid State Disk (SSD), Hard Disk Drive (HOD), and the like can be used as the nonvolatile memory. For example, Dynamic Random Access Memory (DRAM) or the like can be used as the volatile memory. In the present embodiment, the storage unit 14 stores an application 14A, image data 14B associated with time information, used feature data 14C, statistical data 14D, and feature explanation table 14E.

The application 14A is software which operates on the information processing device 1. The application 14A is executed by the control unit 15, and the control unit 15 thereby implements various types of functions (for example, an image analyzing unit 15A, a statistically analyzing unit 15B, a display processing unit 15C, a teaching information acquisition unit 15D, and a feature explaining unit 15E, which will be explained later) according to the present embodiment. The application 14A includes a program which provides various types of user interfaces.

The image data 14B is image files or video files captured by the imaging device C and stored as, for example, digital data. The image data 14B includes, for example, a plurality of image frames and time information corresponding to the image frames. The control unit 15 receives the image data 14B from the imaging device C via the communicating unit 11 and stores the received image data 14B in the storage unit 14.

The use feature data 14C is data indicating a feature quantity used when the control unit 15 analyzes the image data 14B. The control unit 15 extracts persons included in the image data 14B based on the feature quantity indicated by the used feature data 14C, and classifies the extracted persons into either of the first group (for example, specific persons) and The statistical data 14D includes results (for example, statistical amount or value) of the statistical processing executed by the control unit 15. The statistical data 14D includes not only meta-information such as an average, a median, a distributed value, and a standard deviation value, but a wide range of information such as significant information, for example, "crowded", "serving a customer", and the like, as a result of being determined with at threshold value and the like. In addition, the statistical data 14D includes, for example, statistical data concerning the first group, statistical data concerning the second group, or statistical data indicating a relationship between the first group and the second group. The control unit 15 calculates the statistical data 140 and stores the statistical data 14D in the storage unit 14.

The feature explanation table 14E associates type information of the feature quantity indicated in the used feature data 14C with explanatory information explaining the character, role, and feature of the feature quantity, to verbalize the feature quantity contained in the used feature data 14C. For example, the control unit 15 converts the type information of the feature quantity contributing when classifying the persons extracted from image data into either the first group or the second group, into explanatory information, by using the feature explanation data 14E, and presents the explanatory information to the user.

The control unit 15 controls, for example, operations of each of the units, based on commands and the like from the communicating unit 11, the operation accepting unit 12, the storage unit 14. The control unit 15 controls each unit and transmits commands to each unit as needed, based on various types of commands, various types of data, or results calculated based on the commands or the data.

The control unit 15 is electrically connected with each unit by an internal bus B and electrically communicates with each unit. In other words, the control unit 15 can receive data from each unit and provide the data or results calculated based on the data.

The control unit 15 the image analyzing unit 15A, the statistically analyzing unit 15B, the display processing unit 15C, the teaching information acquisition unit 15D, and the feature explaining unit 15E. For example, the control unit 15 may be a processor, and the control unit 15 functions as the image analyzing unit 15A, the statistically analyzing unit 15B, the display processing unit 15C, the teaching information acquisition unit 15D, and the feature explaining unit 15E by reading and executing the application 14A stored in the storage unit 14 as explained above. The control unit 15 may be a hardware circuit, and the image analyzing unit 15A, the statistically analyzing unit 15B, the display processing unit 15C, the teaching information acquisition unit 15D, and the feature explaining unit 15E may also be implemented as hardware circuits.

The image analyzing unit 15A includes an extracting unit 15A1 and a classifying unit 15A2.

The extracting unit 15A1 read the image data 14B stored in the storage unit 14, executes image processing of the read image data 14B, and extracts persons from the image data 14B. The extracting unit 15A1 stores extraction result data 14F indicating extraction results in the storage unit 14.

The classifying unit 15A2 reads the extraction result data 14F from the storage unit 14, and classifies the persons indicated by the extraction result data 14F into either the first group or the second group. For example, the classifying unit 15A2 may classify the persons extracted by the extracting unit 15A1 into three or more groups. In addition, the first group or the second group may be further classified into a plurality of categories. For example, if the target classified by the classifying unit 15A2 is a person, the first group may be a group of specific persons and the second group may be a group of unspecific persons.

The classifying unit 15A2 stores classification result data 14G indicating classification results in the storage unit 14.

The statistically analyzing unit 15B reads the classification result data 14G stored by the storage unit 14, executes statistical processing based on the classification results indicated by the classification result data 14G, calculates the statistical data 14D, and stores the statistical data 14D in the storage unit 14. The statistically analyzing unit 15B may calculate the statistical data of the first group, the statistical data of the second group, and the statistical data for both of the first group and the second group. In addition, the statistically analyzing unit 15B may calculate the relationship, for example, the result of comparison, the difference, and the like between the statistical data of the first group and the statistical data of the second group.

The display processing unit 15C executes the display processing and data transmission for displaying the statistical data 14D obtained by the statistical processing of the statistically analyzing unit 15B on the display device D. In addition, the display processing unit 15C also executes the display processing and data transmission for displaying a result obtained by the feature explaining unit 15E which will be explained later on the display device D. More specifically, the display processing unit 15C executes the display processing for displaying various types of data acquired or generated by the control unit 15 and various types of data stored in the storage unit 14, in the form which can be recognized by the user, by using the display device D, and transmits the data to the display device D. The data displayed by the display processing unit 15C includes, for example, screen data generated by the application 14A which will be explained later under control of the control unit 15, and the other processing result data.

The teaching information acquisition unit 15D acquires the teaching information which is to be used in the classifying unit 15A2 of the image analyzing unit 15A in accordance with the user's operation accepted by the operation accepting unit 12. The teaching information is, for example, correct answer data of the classification results, a sample, data used as criteria. More specifically, for example, if persons extracted by the extracting unit 15A1 are classified into the customer group and the salesclerk group, the teaching information includes designation of the data (image data, attribute data, and the like) corresponding to the persons who should be classified into the customer group or designation of the data corresponding to the persons who should be classified into the salesclerk group, and the like. The teaching information is designated by the user operation on, for example, a teaching information reception screen to be explained later. However, the teaching information may be preliminarily input to the information processing device 1.

The teaching information acquisition unit 15D includes a selecting unit 15D1. The selecting unit 15D1 reads the classification result data 14G stored in the memory 14, and selects persons belonging to a classification boundary region (a predetermined range including the boundary) which classifies the first group and the second group, from the result of classification into the first group and the second group, based on the classification result data 14G. In other words, when the persons extracted by the extracting unit 15A1 is classified into the customer group and the salesclerk group, the selection unit 15D1 selects persons who can hardly be determined to be a salesclerk or a person. More specifically, for example, the selection unit 15D1 calculates first likelihood indicating a probability at which a certain person belongs to the first group and second likelihood indicating a probability at which the person belongs to the second group, determines that the person belongs to the first group if the first likelihood is greater than a first predetermined threshold value, determines that the person belongs to the second group if the second likelihood is greater than a second predetermined threshold value, and determines that the person belongs to the classification boundary region if the person belongs to neither the first group nor the second group. In addition, for example, if an absolute value of the difference between the first likelihood and the second likelihood is below a predetermined threshold value, the selection unit 15D1 may determine that the person belongs to the classification boundary region. Moreover, the selection unit 15D1 may determine the person by using a ratio of the first likelihood to the second likelihood. In the present embodiment, the phrase "not belong to the first group" implies "belonging to the second group" and "belonging to neither the first group nor the second group". Whether the person belongs to the first group or not may be determined by using the first likelihood indicating the probability of belonging to the first group.

The feature explaining unit 15E selects the feature quantity (feature quantity contributing to the classification) which has a large influence to the classification in the classifying unit 15A2, of the feature quantity indicated by the used feature data 14C. Then the feature explaining unit 15E selects explanatory information of the feature quantity having the large influence from the feature explanation tables 14E, and displays the selected explanatory information on the display device D by using the display processing of the display processing unit 15C. The user can thereby recognize the feature quantity contributing to the classification, and its explanation. The feature quantity having the large influence may be, for example, a feature quantity having inverse correlation between the first group and the second group or a feature quantity (feature quantity of the main component) which remains as a result of reducing the number of feature quantities which form the feature space of each of the first group and the second group by executing the principal component analysis.

The feature, explaining unit 15E includes a feature selecting unit 15E1 and an explanation selecting unit 15E2.

The feature selecting unit 15E1 selects the feature: quantity contributing to the classification, of the used feature data 14C, when the classifying unit 15A2 classifies the persons extracted by the extracting unit 15A1 into either the first group or the second group. For example, a difference in selected feature quantity between the first group and the second group is desirably higher than or equal to a predetermined level.

The explanation selecting unit 15E2 selects explanatory information associated with the feature quantity selected by the selected feature selecting unit 15E1, based on the feature explanation table 14E.

Figure 2:
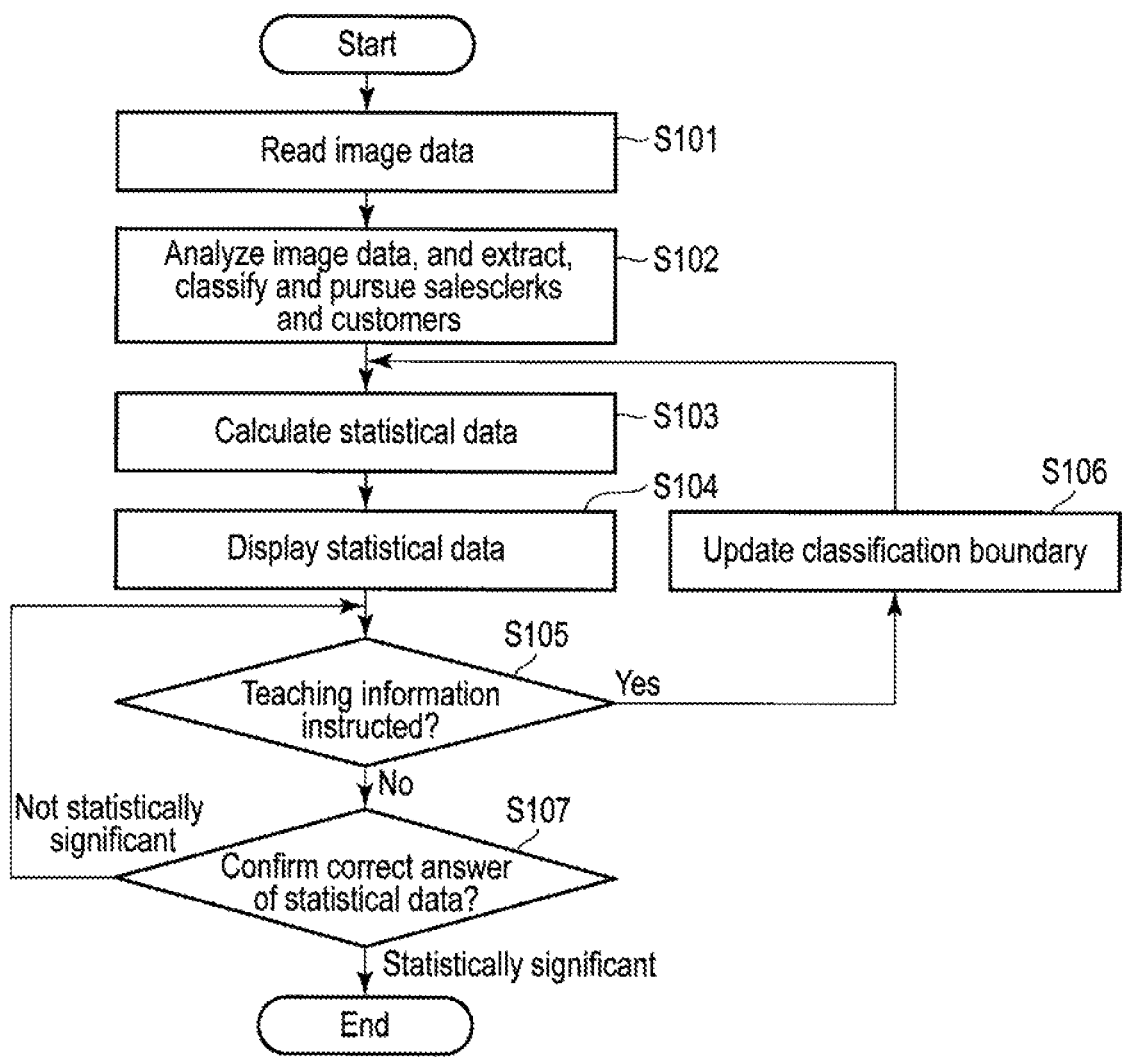
FIG. 2 is a flowchart showing a flow of processing of an information processing device according to the present embodiment.

FIG. 2 is a flowchart showing a flow of processing of the information processing device 1 according to the present embodiment. The processing shown in FIG. 2 will be explained as a display example of the processing, with reference to FIG. 3 to FIG. 5.

In the present embodiment, the imaging device C is attached to, for example, a ceiling of a certain store and can capture the salesclerks and the customer. A plurality of imaging devices C may be attached. The information processing device 1 acquires the image data 14B captured by the imaging device C via the communicating unit 11 in real time and stores the data to the storage unit 14. The image data 14B stored in the storage unit 14 is assumed to include not only the image data to be acquired later, but also the already acquired image.

In step S101, the control unit 15 reads the image data 14B stored in the storage unit 14.

In step S102, the extracting unit 15A1 of the image analyzing unit 15A analyzes the image data 14B read from the storage unit 14 and extracts objects from the image data 14B. The classifying unit 15A2 classifies the persons extracted by the extracting unit 15A1 into the group of specific persons and the group of unspecific persons.

In the following explanations, the group of specific persons is the salesclerk group and the group of unspecific persons is the customer group. However, the group of specific persons and the group of unspecific persons may be variously modified in accordance with the place at which the imaging device C is attached, environment, and contents of analysis.

A plurality of methods is considered as the image analysis method executed by the extracting unit 15A1 and the classifying unit 15A2. Two types of image analysis methods will be hereinafter explained as examples.

In the first image analysis method, the information processing device 1 preliminarily stores the used feature data 14C including feature quantities concerning features of each salesclerk such as the position, clothes, face and the like, in the storage unit 14. More specifically, the used feature data 14C includes one or more information elements of the position information indicating salesclerk's positions, color information indicating features such as salesclerk's clothes, detection frequency of a salesclerk, salesclerk's face feature information, and salesclerk's behavior information.

The positional information is, for example, information on places such as registers at which salesclerks are fixedly detected, or information on specific places at which only salesclerks are allowed to enter. In addition, the positional information may be detected by a sensor given to each salesclerk. For example, the sensor transmits salesclerk identification information and positional information to the information processing device 1 by wireless communications.

The detection frequency of a salesclerk is a feature quantity which is based on difference in extraction frequency between salesclerks and customers. Since salesclerks stay in the store, the same salesclerk is extracted repeatedly at a high possibility. In contrast, since customers only stay in the store temporarily because of shopping and the like, the same customer is extracted repeatedly at a low possibility. The image analyzing unit 15A may automatically extract a person of a high detection frequency as a salesclerk candidate.

The salesclerk's face feature information is, for example, image data of the face of a salesclerk used as a sample. The salesclerk's face feature information may be, acquirable by directly specifying the information on an image displayed on the display device using the operation accepting unit 12 by the user.

The salesclerk's behavior information is a feature quantity based on a matter that salesclerk's behavior can easily be patternized as compared with customers. The salesclerk's behavior information is desirably learned in advance. For example, workplaces and work names of each salesclerk are first defined as states. Next, a transition probability between the states is obtained by actually monitoring the salesclerk's behavior. More specifically, for example, if the first state is defined as "cashier" and the second state is defined as "work in backyard", a probability that the salesclerk transits from the first state "cashier" to the second state "work in backyard" is obtained by learning, and a probability that the salesclerk remains in the first state "cashier" is further obtained. Using the transition probability between the states, the classifying unit 15A2 obtains a probability that a certain person is a salesclerk by multiplying the transition probability every time the person acts and state transition occurs. The classifying unit 15A2 determines a person with a high probability of being a salesclerk as a salesclerk.

The salesclerk's behavior information may not be preliminarily learned and it may be determined whether a certain person is a salesclerk or not by a simple algorithm. For example, the classifying unit 15A2 may automatically classify a person of a high detection frequency as a salesclerk candidate.

The extracting unit 15A1 extracts person areas reflected in the image data 14B. The classifying unit 15A2 determines whether each person area is a salesclerk or a customer, based on person areas obtained from the extraction result data 14F read from the storage unit 14, and the feature quantities included in the used feature data 14C read from the storage unit 14. For example, pattern recognition may be used for the classification.

In the second image analysis method, the information processing device 1 determines whether a certain person is a salesclerk or a customer without prior knowledge.

For example, the classifying unit 15A2 may determine whether the person area extracted by the extracting unit 15A1 is a salesclerk or a customer, by clustering, teacherless learning, multivariate analysis, metric learning, and the like. The multivariate analysis is, for example, is factor analysis and the like. The metric learning is, for example, discriminant analysis and the like.

In the metric learning, the classifying unit 15A2 learns feature space where classification precision becomes high, while evaluating whether salesclerks and customers have been well classified for each learning sample input in the information processing device 1. In this case, for example, weight on the specific learning sample specified by the user may be increased. This specific learning sample is, for example, a learning sample in which the user considers that salesclerks and customers can easily be distinguished. Thus, learning progresses to classify the designated sample preferentially, and a result which agrees with a human intuition can easily be obtained.

In addition, the classification unit 15A2 may employ semi-supervised learning in the metric learning. In the semi-supervised learning, classification performance of the metric learning is improved by using not only a several patterns of teaching information (correct answer data of the determination result of a salesclerk and a customer) which is preliminarily input, but a large quantity of unteaching patterns (data which does not specify a salesclerk and a customer).

The classifying unit 15A2 may pursue a specific salesclerk or customer after classifying salesclerks and customers by using the first image analysis method and the second image analysis method. In this pursuit, for example, pursuing processing such as executing pattern recognition between image data elements is used.

In addition, in the present embodiment, targets of classification which are to be classified by the classifying unit 15A2 are two groups, i.e., the salesclerk group and the customer group. However, the targets of classification may be three or more groups including targets of classification other than these.

In step S103, the statistically analyzing unit 15B calculates the statistical data 14D by using the classification result of the salesclerk group and the customer group obtained in step S102, and stores the statistical data 14D in the storage unit 14.

The statistical data 14D includes, for example, time variation of the statistic value to the customer group, and time variation of the statistic value to the salesclerk group, in a specific time zone or place. More specifically, the statistical data 14D includes the number of customers or salesclerks, change (hereinafter called a flow) of positions of a customer or a salesclerk, attribute information of customers such as sex, age and the like, the degree of crowdedness of the customers, and the like.

In addition, the statistical data 14D includes a mutual relationship between the time variation of the statistic value to the customer group and the time variation of the statistic value to the salesclerk group. More specifically, the statistical data 14D includes, for example, a ratio in number of salesclerks to customers (number of the salesclerks/number of customers). The high ratio in number indicates that the number of salesclerks is sufficient. In contrast, the low ratio in number indicates that the salesclerks are short. In addition, the statistical data 14D includes a ratio of operation of the salesclerks. The ratio of operation of the salesclerks is obtained by extracting time (serving time) in which the each salesclerk is in contact with the customers. Furthermore, if a salesclerk and a customer are in contact at a cashier, it can be recognized that the customer has purchased goods. The statistical data 14D may include changes in time of the information (number of persons who have purchased, time spent for purchase, movement routes of purchasing customers in the space, and the like) concerning this customer's purchase behavior, and changes in time of the number of customers in each of a plurality of small areas included in the space.

The statistical data 14D is desirably managed by a hierarchical structure, a list structure using a pointer, and the like. However, the statistical data 14D may be managed by a table.

In step S104, the display processing unit 15C executes display processing for displaying the statistical data 14D on the display device D. A display example of the statistical data 14D will be explained with reference to FIG. 3 to FIG. 5.

Figure 3:
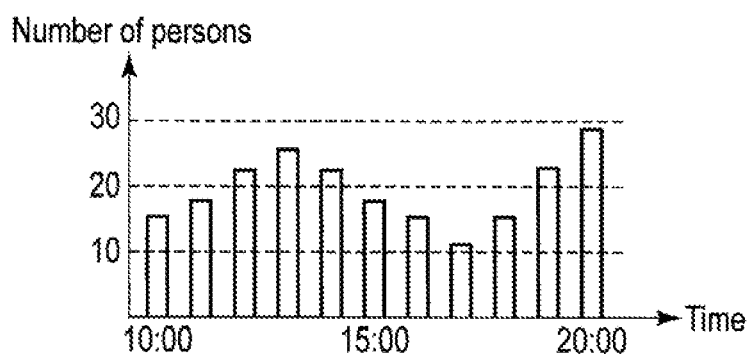
FIG. 3 is a bar graph illustrating the degree of crowdedness of customers for each time according to the present embodiment.

The display processing unit 15C executes display processing for displaying the above-mentioned statistical data 14D on the display device D in, for example, a graph form in which a horizontal axis indicates a time and a vertical axis indicates statistic. The user may select the type of the displayed graph from, for example, general graph types such as a bar graph and a line graph. Alternately, the optimal graph type may be selected in accordance with the type of the statistical data 14D by the display processing unit 150. For example, FIG. 3 is a bar graph illustrating the degree of crowdedness of the customers for each time. A horizontal axis indicates a time and a vertical axis indicates the number of customers.

The display processing unit 15C may change the scale of the statistic (vertical axis) of the graph in accordance with the scale of the displayed time (horizontal axis). For example, if transition of the statistic in each day is displayed, the display range of the vertical axis may be determined based on the average of the statistic per day. In addition, if transition of the statistic in each hour is displayed, the display range of the vertical axis may be determined based on the average of the statistic per hour. The display processing unit 15C can display various types of graphs without time-axis such as a pie graph, a histogram, a bar graph, and a scatter diagram and the like.

FIG. 4 is an illustration showing customer flows in a certain time zone. Customer flows (change in time of positions) are illustrated such that the change in time of the customers in space as represented by image data 14B can be pursued. More specifically, as shown in FIG. 4, the customer flows are expressed by arrows, for example on the illustration in a store. The display processing unit 15C may execute processing of displaying broad arrows in a case where a number of persons are moving or processing of chancing colors of the arrows under conditions.

The display processing unit 15C may execute processing of displaying not only the illustration showing the customer flows in a certain time zone, but also typical behaviors of the customers in the time zone. The typical behavior is output as linguistic information. Methods of outputting the linguistic information are, for example, text display, voice output, and the like. The typical behavior is desirably a behavior of the highest frequency, of all the extracted behaviors. In the example of FIG. 4, texts such as "move to shelf 7", "move to shelf 10", and "move to cashier" or a text of combination of these texts is displayed together with the illustration indicating the customer flows.

The display processing unit 15C may display an illustration showing salesclerk flows or an illustration showing both the customer flows and the salesclerk flows.

FIG. 5 is an illustration showing a customer's congestion degree in a certain time zone. As shown in FIG. 5, the degree of crowdedness is, for example, displayed for each of small zones obtained by dividing the in-store illustration for each certain area. The display processing unit 15C executes processing of calculating the customer density for each small area and displaying the calculated density on the illustration by, for example, collecting the number of the customers for each small area included in the store in the time zone. In addition, for example, the small zones corresponding to the places where the customer density in the store is high are painted in a color deeper than the other small zones.

The display processing unit 15C may execute processing of displaying an image captured in a time zone in which the store is crowded, together with the degree of crowdedness, on the display device D whether the store is crowded or not is determined based on, for example, whether the number of the customers in the store exceeds a preliminarily defined threshold value or not. Alternately, whether the store is crowded or not may be determined based on, for example, whether a rate of an area in which the persons exist to the floor area in the store exceeds a preliminarily defined threshold value or not.

The display processing unit 15C may execute processing of displaying an image of a face of a person appearing frequently, together with the above-mentioned statistical data 14D, on the display device D.

In step S105 of FIG. 2, the control unit 15 confirms whether teaching information has been instructed from the user by the operation accepting unit 12 or not. If the teaching information is instructed, the classifying unit 15A2 stores in the storage unit 14 classification result data 14G in which the classification boundary between the salesclerks and the customers is updated by using the instructed teaching information, in step S106. After that, the processing returns to step S103 and the statistically analyzing unit 153 recalculates the statistical data 14D based on the updated classification result data 14G. In contrast, if the teaching information is not instructed, the processing proceeds to step S107.

Confirming whether the teaching information has been instructed or not (step S105) may be executed at different timing. For example, step S105 may be executed after the classification result of the image data is obtained in step S102 and before the statistical data 14D is calculated in step S103. In this case, since the statistical data 14D is calculated by using the classification boundary updated by the teaching information from the start (step S103), the high-precision statistical data 14D is displayed on the display device D by the display processing unit 15C from the start.

In step S107, the statistically analyzing unit 15B executes on of the correct answer of the statistical data 14D. More specifically, the statistically analyzing unit 15B determines whether the statistical data 14D is statistically significant to the result of classification of the salesclerks and the customers or not, by using, for example t-test, p-test, and the like. If the statistical data 14D is not statistically significant as a result of the determination, the processing returns to step S105. In this case, the control unit 15 becomes waiting status until the change of the classification boundary is instructed in step S105. Then the classifying unit 15A2 updates the classification result data 14G by using the newly designated classification boundary in step 2106, and the statistically analyzing unit 15B recalculates the statistical data 14D in step S103. In contrast, if the statistical data 14D is determined to be statistically significant, the processing is ended.

FIG. 6 is a flowchart showing state transition of a user interface of the information processing device 1 according to the present embodiment. Each status of the user interface will be explained hereinafter by referring to examples of the user interface screen shown in FIG. 7 to FIG. 9.

Figure 7:
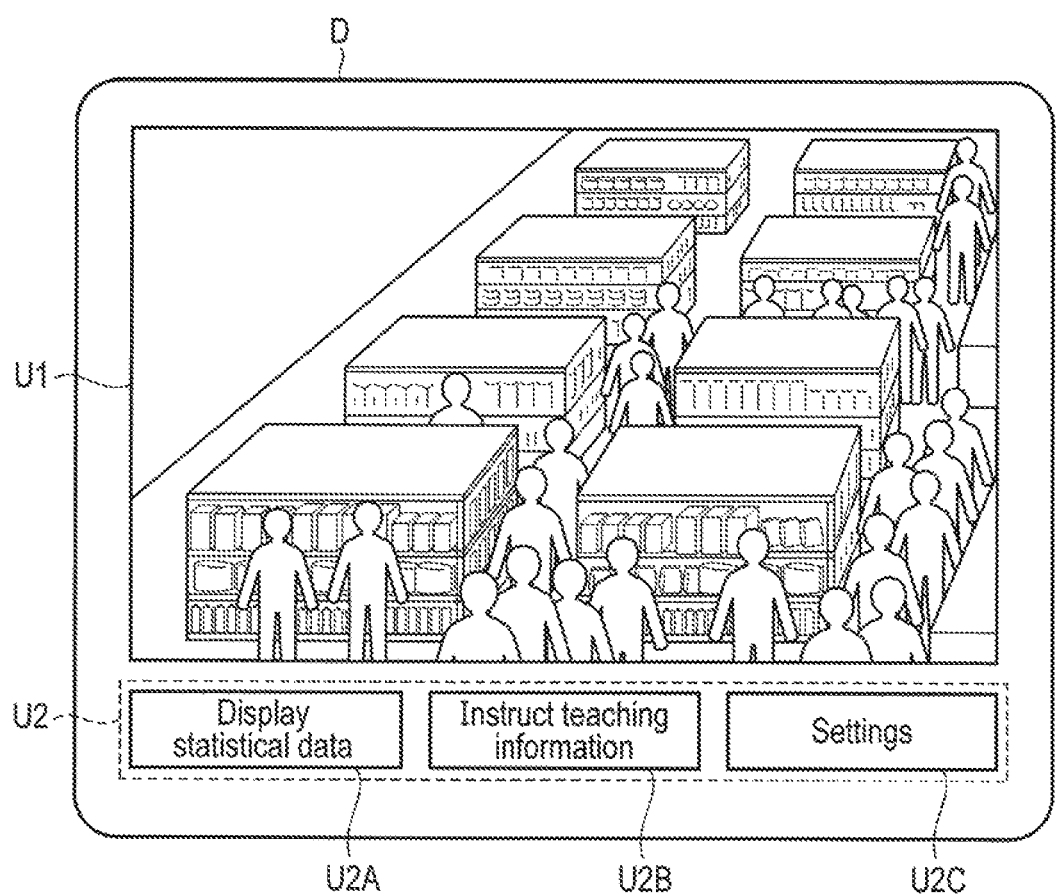
FIG. 7 is an illustration showing an example of a main screen according to the present embodiment.

In step S301, the display processing unit 15C of the control unit 15 executes processing of displaying a main screen on the display device D. FIG. 7 is an illustration showing an example of a main screen. The main screen includes, for example, an image display U1 displaying the image data received from the imaging device C on real time and a menu display U2. The menu display U2 includes a statistical data display button U2A for transitioning a screen to a statistical data screen, a teaching information instruction button U2B for transitioning a screen to a teaching information acquisition screen, and a setting button U2C for transitioning a screen to a setting screen.

Every time the image analyzing unit 15A receives the image data 14B from the imaging device C, the image analyzing unit 15A desirably analyzes the image data 14B, irrespective of the execution of the user operation. The acquisition and analysis of the image data 14B correspond to the processing in steps S101 and S102 of FIG. 2.

In step S302, the control unit 15 requests the user to select any n one of menus of the menu display U2.

If the statistical data display button U2A is selected in step S302, the display processing unit 15C of the control unit 15 executes processing of displaying a statistical data screen on the display device D in step S303. More specifically, the statistically analyzing unit 15B calculates the statistical data 14D based on the image analysis result obtained by the image analyzing unit 15A, and the display processing unit 15C executes processing of displaying the calculated statistical data 14D on the display device D. The analysis and display of the statistical data 14D correspond to the processing in seeps S103 and S104 of FIG. 2. The statistical data screen is, for example, a screen shown in FIG. 3 to FIG. 5. If the statistical data screen is ended, the processing returns to the main screen display (step S301).

If the teaching information instruction button U2B is selected in step S302, the display processing unit 15C of the control unit 15 executes processing of displaying a teaching information instruction screen on the display device D in step S304. FIG. 8 is an illustration showing an example of the teaching information instruction screen concerning the classification of the salesclerks and the customers. On the teaching information instruction screen, the teaching information acquisition unit 15D presents information of persons belonging to a classification boundary region (a predetermined range including the boundary) to the user, and acquires results of requesting the user to classify the persons as teaching information.

In the example of FIG. 8, a face image or figure image of person distant from the classification boundary between the salesclerk group and the customer group, i.e., a person which can easily be determined to belong to the salesclerk group or the customer group, is displayed separately on the right and left sides of the screen of the display device D. On the screen, a salesclerk candidate list U3A is displayed on the left side, and a customer candidate list U3B is displayed on the right side.

In addition, the selecting unit 15D1 of the teaching information acquisition unit 15D selects face images or figure images of persons each of whom is determined to be hardly classified into a salesclerk or a customer by the classifying unit 15A2, and requests the images to be displayed in a boundary person list U3C of the screen.

The persons displayed in the boundary person list U3C may be restricted in accordance with the time and place at which the persons have been extracted. For example, if a person determined to be hardly classified has been extracted in the area indicating the cashier, the selecting unit 15D1 may determines that the person is not a customer and may not display the person in the boundary person list U3C.

In step S305, the teaching information acquisition unit 15D requests the user to classify the boundary person list U3C. The teaching information acquisition unit 15D classifies the persons in the boundary person list U3C into the salesclerk group or the customer group, by moving each person in a rectangular shape in the boundary person list U3C to either the salesclerk candidate list U3A or the customer candidate list U3B in accordance with the user operations accepted by means of the operation accepting unit 12. The user operations are, for example, a drag and drop operation using a mouse, a drag operation on a touchpanel, and the like. The teaching information acquisition unit 15D acquires this classification result as the correct answer data to the classification, i.e., as the teaching information. The persons of the boundary person list U3C which have been classified are deleted from the boundary person list U3C.

In step S306, the teaching information acquisition unit 15D confirms whether the boundary person list U3C is empty or not. If the boundary person last U3C is not empty, the processing returns to step S306 and the user is requested to classify the persons in the rectangular shape in the boundary person list U3C again. If the boundary person list U3C is empty, for example, the teaching information acquisition unit 15D notifies the image analyzing unit 15A that the reclassification has been completed, and requests the statistically analyzing unit 15B to recalculate the statistical data 14D. That is, the classifying unit 15A2 updates the classification boundary, based on the acquired teaching information. In other words, the classifying unit 15A2 updates the classification boundary, based on the designation from the user indicating that the person selected by the selecting unit 15D1 belongs to the salesclerk group or the customer group. Then, the classifying unit 15A2 reclassifies the salesclerk group and the customer group, based on the updated classification boundary. The statistically analyzing unit 15B recalculates the statistical data 14D, based on the updated classification result. Furthermore, the display processing unit 15C executes processing of displaying the calculated statistical data 14D again on the display device D. These steps of processing correspond to the processing in steps S103 to S106 of FIG. 2.

The display processing unit 15C may execute processing of displaying on the display device D a message to promote the user's classification of the persons displayed in the boundary person list U3C, to acquire the teaching information executed by the teaching information acquisition unit 15D.

By repeating steps S304 to S306, learning of the statistically analyzing unit 15B progresses and the higher-precision statistical data 14D can be obtained. If the teaching information instruction screen is ended, the processing returns to the main screen display (step S301).

The screen configuration of the teaching information instruction screen is not limited to the above-explained screen. For example, the salesclerk candidate list U3A and the customer candidate list U3B may be displayed separately at an upper part and a lower part of the screen. In addition, the boundary person list U3C may be displayed between the salesclerk candidate list U3A and the customer candidate list U3B.

If the setting button U2C is selected in step S302, the display processing unit 15C of the control unit 15 executes processing of displaying a setting screen on the display device D, in step S305. FIG. 9 is an illustration showing an example, of a setting screen. Is the setting screen, the user executes setting for calculation of the statistical data 14D and other setting concerning the information processing device 1.

In the example of FIG. 9, a period display U4A for inputting a period of collection of the data which is the target of the statistical processing, a classification display U4B for selecting classifications which is the target of the statistical processing, a type display U4C for selecting types of the displayed statistical data 14D, and the like are displayed. For example, if the user does not wish to include the salesclerks in the in the statistical data 14D indicating the result of the statistical processing, the user executes selection indicating that the only customers are selected in the classification display U4B. The user can select a plurality of types of the statistical data 14D that the user wishes to display, in the type display U4C. The setting screen shown in FIG. 9 is an example and the setting screen may be displayed in other display forms or may include other display contents.

If the setting screen is ended, the processing returns to the main screen display (step S301).

The user interface for classifying the persons is shown in FIG. 6 to FIG. 9 but the same user interface can be applied when objects other than persons are classified.

FIG. 10 shows an example of a feature explanation table 14E according to the present embodiment.

The feature explaining unit 15E of the control unit 15 selects explanatory information of the feature quantities which have contributed to the classifying unit 15A2 classifying each person into a salesclerk and a customer, in the user interface of the information processing device 1. The display processing unit 150 executes processing of displaying the selected explanatory information by using the display device D. The user interface is, for example, statistical data display (FIG. 3 to FIG. 5), a teaching information instruction screen, or the like. The explanatory information may not be displayed but, for example, output as voice. The feature explaining unit 15E selects the explanatory information corresponding to the feature quantities included in the used feature data 14C, by using the feature explanation table 14E preliminarily stored in the storage unit 14.

The feature explanation table 14E associates the feature, quantities and the explanatory information included in the used feature data 14C in a table form. For example, the used feature data 14C is assumed to be n-dimensional vectors composed of a color of clothes, a type of clothes, existence of a hat, a type of accessories, and the like. In this case, the feature explanation table 14E includes n tables associated with the explanatory information for each dimension of the used feature data 14C. In the example of FIG. 10, the feature indicating the color of clothes, of the used feature data 14C, is associated with the explanatory information on a table T1. In addition, the feature indicating the type of clothes, of the used feature data 14C, is associated with the explanatory information on a table T2. "0x" is a prefix symbol indicating a hexadecimal number.

The feature explaining unit 15E, by using a feature quantity contributing to classification of the salesclerks and the customers as key information, selects the explanatory information corresponding to the feature quantity from the feature explanation table 14E. For example, if (0x100, 0x202) included in the used feature data 14C gives a great influence to the classification result, explanatory information elements "red clothes" and "jacket" are selected.

In the above-described present embodiment, the image analyzing unit 15A of the information processing device 1 executes image processing for the image data 14B and classifies persons into, for example, the first group and the second group such as specific persons and unspecific persons. The statistically analyzing unit 15B calculates the statistical data 14D based on this classification result. In addition, the image analyzing unit 15A updates the classification boundary and the classification result based on the instructed teaching information of the boundary area. Then, the statistically analyzing unit 15B recalculates the statistical information based on this updated classification result. The user can obtain the high-precision statistical data 14D by repeating the processing.

In addition, the teaching information acquisition unit 15D interactively acquires the teaching information via the user interface of the for processing device 1. Since the user can thereby easily instruct the teaching information, user convenience can be improved.

In the present embodiment, the target group subjected to statistical processing can be selected by the user. The information processing device 1 can thereby execute the statistical processing for the only group selected by the user and present the statistics result.

In the present embodiment, the display processing unit is of the information processing device executes processing of displaying the statistical data 14D on the display device D using the graph in which the horizontal axis indicates the time and the vertical axis indicates the statistic. Since the time information is used, the user can easily recognize the point of change of the statistic and estimate a trend of the statistic. In addition, when cooperating with monitor video, the information processing device 1 can easily access the video of a desired period included in the monitor video by referring to the time axis.

In the present embodiment, if the user presets salesclerk's face, feature information, in the first image analyzing method, the display processing unit 15C may execute processing of displaying a person similar to the face feature information on the display device D. Furthermore, the display processing unit 15C may execute processing of displaying a moving image of pursuing the person on the display device D. The information processing device 1 can thereby present a result of pursuing a specific person to the user.

In the present embodiment, the user can easily recognize what the feature quantity considered important in the classification is.

In the present embodiment, learning of the salesclerk's behavior information may be executed by using the meta-information to which the meaning of the data is assigned as a label.

In the present embodiment, the used feature data 14C may be a set of the meta-information to which the meaning of each element of the used feature data 14C is assigned as a label. In this case, explanation of the used feature data 14C may be executed by displaying the label of each element without using the feature explanation table 14E.

In the present embodiment, only one group of a plurality of group obtained as a result of being classified by the classifying unit 15A2 may be a target of the statistical processing of the statistically analyzing unit 15B, and two or more groups of the groups may be targets of the statistical processing of the statistically analyzing unit 15B. Moreover, images or statistical information of only one group may be targets of the display processing of the display processing unit 15C or images or statistical information of two or more groups may be targets of the display processing of the display processing unit 15C.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
an imaging sensor; and
an information processing device, wherein the imaging sensor is configured to capture a plurality of frames of image data and transmit the image data to the information processing device wirelessly in real time,
the information processing device includes:
   a processor circuit;
   a display device; and
   a storage unit which is connected to the processor circuit and is configured to store the image data and feature explanation information associating type information of feature quantities with explanatory information explaining the type information of the feature quantities,
the processor circuit is configured to:
   execute metric learning using semi-supervised learning algorithm using teaching information instructed from a user by an operation accepting device and unteaching information to improve classification performance of the metric learning,
   extract person image targets from the image data stored in the storage unit by executing image processing based upon the image data,
   execute determining whether each of the person image targets included in the image data belongs to a first group or not based upon the feature quantities of each of the person image targets and a result of the metric learning, and storing, in the storage unit, determination result data obtained by the determining,
   calculate, by executing a statistical processing, at least one of first statistical information of person image targets determined to belong to the first group or second statistical information of person image targets determined not to belong to the first group,
   execute selecting at least one of the feature quantities which contributed to the determining whether the person image targets belong to the first group or not,
   select explanation information associated with the at least one of the feature quantities from the storage unit based upon the feature explanation information stored in the storage unit, and
   display, on the display device:
      at least one of the calculated first statistical information and the calculated second statistical information, and the selected explanation information, and the selecting includes selecting the at least one of the feature quantities having an inverse correlation between the first group and a second group which is not the first group.

2. The information processing system of claim 1, wherein the processor circuit is further configured to display, on the display device, an image of one of the person image targets determined to belong to the first group and an image of one of the person image targets determined not to belong to the first group.

3. The information processing system of claim 2, wherein the processor circuit is further configured to acquire the teaching information indicating whether a specific person image target displayed belongs to the first group or not.

4. The information processing system of claim 3, wherein the processor circuit is further configured to determine whether the specific person image target belongs to the first group or not based on the teaching information.

5. The information processing system of claim 2, wherein the processor circuit is further configured to display person image target belonging to a boundary area between the first group and the second group which is not the first group.

6. The information processing system of claim 5, wherein the boundary area is an area based on likelihood information calculated by the processor circuit.

7. The information processing system of claim 1, wherein the first statistical information includes a result of the statistical processing for the person image targets determined to belong to the first group, the second statistical information includes a result of the statistical processing for the person image targets determined not to belong to the first group, and the feature quantities include a numerical amount value used by analyzing the image data.

8. The information processing system of claim 1, wherein the first group is a group of specific person image targets, and the second group is a group of unspecific person image targets.

9. The information processing system of claim 8, wherein the specific person image targets are salesclerk image targets, and the unspecific person image targets are customer image targets.

10. The information processing system of claim 1, wherein the processor circuit is further configured to select the at least one of the feature quantities which contributed to the determining whether the image objects belong to the first group or not by executing a principal component analysis.

* * * * *